United States Patent
Tsukahara et al.

[11] Patent Number: 6,048,637
[45] Date of Patent: Apr. 11, 2000

[54] NONAQUEOUS SECONDARY BATTERY

[75] Inventors: Jiro Tsukahara; Masayuki Negoro; Koji Wariishi; Michio Ono, all of Kanagawa, Japan

[73] Assignee: Fuji Photo Film Co., Ltd., Kanagawa, Japan

[21] Appl. No.: 09/203,759

[22] Filed: Dec. 2, 1998

[30] Foreign Application Priority Data

Dec. 17, 1997 [JP] Japan .................................. 9-348241

[51] Int. Cl.$^7$ ...................................................... H01M 2/12
[52] U.S. Cl. ........................... 429/53; 429/188; 429/203; 429/212; 429/218.1; 429/330; 429/332; 429/57
[58] Field of Search ..................... 429/188, 203, 429/212, 330, 332, 53, 57, 218.1

[56] References Cited

U.S. PATENT DOCUMENTS

| | | | |
|---|---|---|---|
| 3,926,675 | 12/1975 | Kohlmuller et al. ..................... | 429/13 |
| 4,397,925 | 8/1983 | Magahed ................................. | 429/207 |
| 5,260,148 | 11/1993 | Idota ....................................... | 429/198 |
| 5,484,683 | 1/1996 | Tsukahara et al. ..................... | 430/203 |

*Primary Examiner*—Laura Weiner
*Attorney, Agent, or Firm*—Sughrue, Mion, Zinn, Macpeak & Seas, PLLC

[57] ABSTRACT

A nonaqueous secondary battery is disclosed, comprising a positive electrode, a negative electrode, and a nonaqueous electrolytic solution containing a lithium salt, wherein the battery contains a hydrazine derivative represented by formula (I):

$$R_1R_2N\text{—}NR_3R_4 \qquad (I)$$

wherein $R_1$, $R_2$, and $R_3$ each represents an alkyl group, an aryl group, a heterocyclic group, an acyl group, an oxycarbonyl group or a sulfonyl group; and $R_4$ represents an acyl group, an oxycarbonyl group or a sulfonyl group.

9 Claims, 1 Drawing Sheet

FIGURE
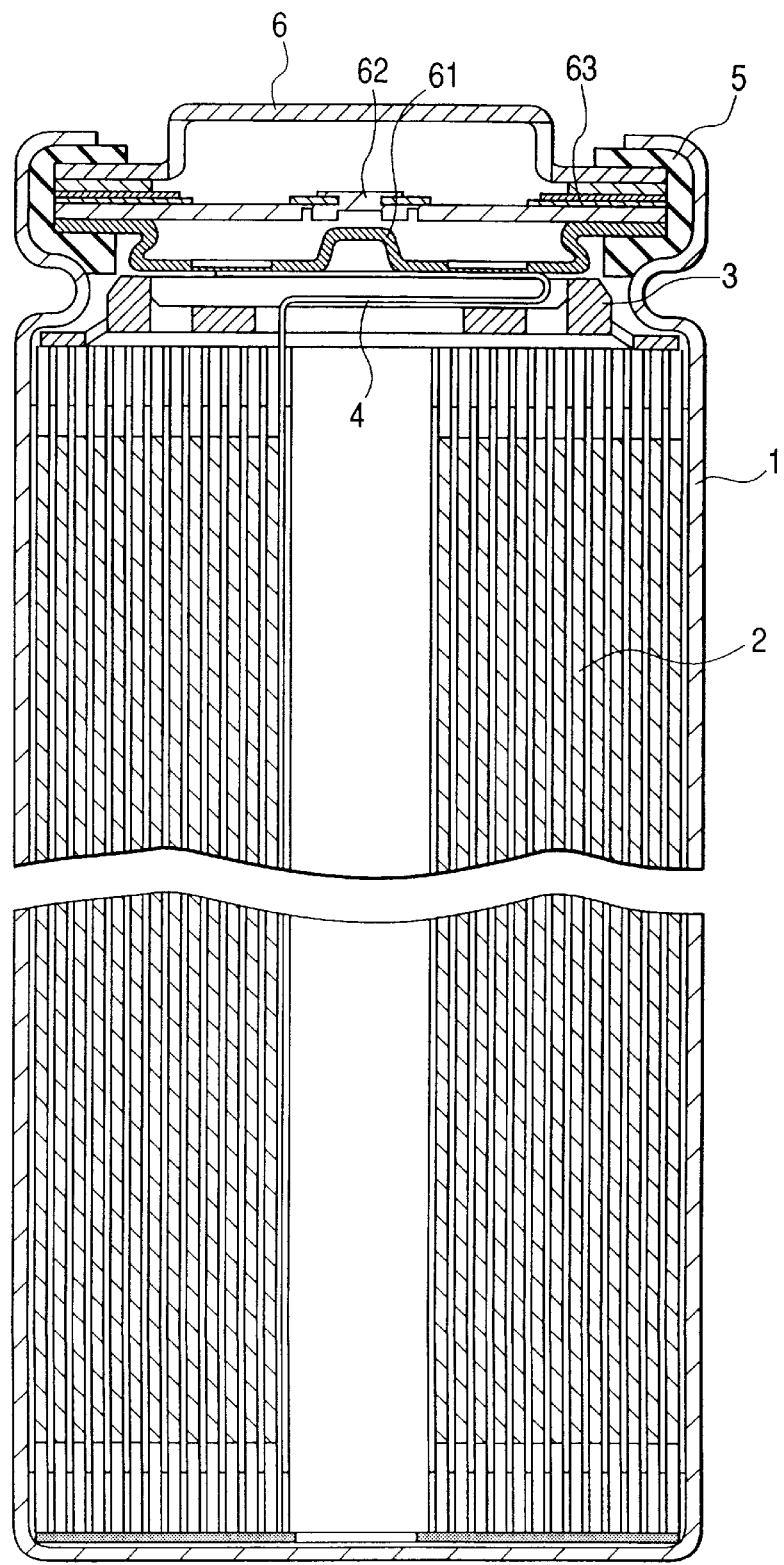

NONAQUEOUS SECONDARY BATTERY

FIELD OF THE INVENTION

This invention relates to a nonaqueous secondary battery, particularly a nonaqueous secondary battery having a high capacity, excellent cycle stability, and high safety.

BACKGROUND OF THE INVENTION

A nonaqueous secondary battery utilizing lithium (lithium secondary battery) is composed of positive and negative electrodes containing a material capable of intercalating and deintercalating lithium, a nonaqueous electrolytic solution (i.e., a nonaqueous liquid electrolyte) containing a lithium salt, and members for holding or separating these parts. The lithium secondary battery is characterized by a high voltage and a high capacity because lithium, which carries electric charges, is light and has an extremely negative potential. However, to have a large quantity of energy stored means to have a great force of destruction in case of runaway of the battery reaction. Therefore security of battery safety is one of the most important subjects in the art. In order to secure safety under conditions of practical use, countermeasures against abnormalities that have been put into practice to date include a porous separator provided between positive and negative electrodes which cuts off an electric current at or above a certain temperature; a safety valve which relieves pressure in case of increase of the internal pressure due to an abnormal reaction, etc.; and a mechanism for cutting an electric current synchronously with the movement of the safety valve (as described in U.S. Pat. No. 4,943,497).

However, there has been a constant demand for a further increased battery capacity, and development of a further improved safety mechanism has been demanded. An attempt is described in JP-A-9-106835 (the term "JP-A" as used herein means an "unexamined Japanese patent application"), in which a battery is protected from destruction by using a compound capable of electrochemically polymerizing at an abnormally high voltage in case of an overcharge thereby to increase the electric resistance of the electrolytic solution. The compounds disclosed include aromatic compounds such as biphenyl, thiophene, and furan. However, these compounds involve the problem that the battery capacity decreases as the amount of the compound increases.

SUMMARY OF THE INVENTION

An object of the present invention is to improve cycle stability and safety of a lithium secondary battery without reducing the capacity. More specifically, the object is to provide a specific material which improves cycle stability and safety of a lithium secondary battery without reducing the capacity.

The object of the present invention is accomplished by a nonaqueous secondary battery comprising a positive electrode, a negative electrode, and a nonaqueous electrolytic solution (i.e., a nonaqueous liquid electrolyte) containing a lithium salt, wherein the battery contains a hydrazine derivative represented by formula (I):

$$R_1R_2N-NR_3R_4 \quad (I)$$

wherein $R_1$, $R_2$, and $R_3$ each represents an alkyl group, an aryl group, a heterocyclic group, an acyl group, an oxycarbonyl group or a sulfonyl group; and $R_4$ represents an acyl group, an oxycarbonyl group or a sulfonyl group.

According to the present invention, a nonaqueous secondary battery having improved cycle stability and improved safety can be obtained without impairing the battery capacity.

BRIEF DESCRIPTION OF THE DRAWING

FIG. 1 is a cross-sectional view of the cylindrical battery prepared in Examples.
Explanation of Reference Numeral:
1. Battery case serving as negative electrode
2. Electrode group (rolled up)
3. Upper insulating plate
4. Positive electrode lead
5. Gasket
6. Battery lid serving as positive electrode terminal
61. Pressure-sensitive value
62. Current breaking element (switch)
63. PTC element

DETAILED DESCRIPTION OF THE INVENTION

In formula (I), $R_1$, $R_2$, and $R_3$ each represents a substituted or unsubstituted alkyl group having 1 to 12 carbon atoms, such as methyl, ethyl, isopropyl, t-butyl, vinyl, allyl, cyclohexyl, and benzyl groups; a substituted or unsubstituted aryl group having 6 to 20 carbon atoms, such as phenyl and naphthyl groups; a substituted or unsubstituted heterocyclic group having 1 to 12 carbon atoms, such as pyridyl, pyrazyl, quinolyl, furyl, thienyl, benzimidazolyl and indazolyl groups; a substituted or unsubstituted acyl group having 1 to 12 carbon atoms, such as formyl, acetyl, pivaloyl and benzoyl groups; a substituted or unsubstituted oxycarbonyl group having 1 to 12 carbon atoms, such as methoxycarbonyl, t-butoxycarbonyl, benzyloxycarbonyl and phenoxycarbonyl groups; or a sulfonyl group, such as methylsulfonyl, phenylsulfonyl and p-toluenesulfonyl groups.

In formula (I), $R_4$ represents a substituted or unsubstituted acyl group, such as formyl, acetyl, pivaloyl and benzoyl groups; a substituted or unsubstituted oxycarbonyl group having 1 to 12 carbon atoms, such as methoxycarbonyl, t-butoxycarbonyl, benzyloxycarbonyl, and phenoxycarbonyl groups; or a sulfonyl group, such as methylsulfonyl, phenylsulfonyl and p-toluenesulfonyl groups.

$R_1$, $R_2$, $R_3$ and $R_4$ may be connected to each other to form a 3- to 9-membered ring together, respectively.

The substituents on $R_1$, $R_2$, $R_3$ or $R_4$ are not particularly limited, but those incurring no side reactions in a battery are preferred. Examples of suitable substituents include an alkyl group, an aryl group, an acyl group, an oxycarbonyl group, a sulfonyl group, an alkoxy group (e.g., methoxy, ethoxy or benzyloxy group), an aryloxy group (e.g., a phenoxy group), an amino group (e.g., dimethylamino, diphenylamino or N-methylanilino group), a fluorine atom, a mercapto group (e.g., methylthio or phenylthio group), an amido group (e.g., an N-methylacetamido group), a carbamoyl group (e.g., an N,N-dimethylcarbamoyl group), an acyloxy group (e.g., acetoxy or benzyloxy group), a sulfonamido group (e.g., an N-methylsulfonamido group), a sulfamoyl group (e.g., an N,N-dimethylsulfamoyl group), a urethane group (e.g., an N-methylmethoxycarbonylamino group), and a ureido group (e.g., an N,N,N'-trimethylureido group).

It is preferred that the hydrazine derivative represented by formula (I) is inactive at a normal voltage under normal charge and discharge conditions and realizes desired effects in case of emergence of a high voltage environment due to abnormalities. The desired effects expected of the hydrazine derivative include a phenomenon that the derivative is subjected to decomposition reaction under a high voltage environment to cause an increase of the internal pressure in a battery which can ensure the working mechanism of a current breaking switch, or the derivative adheres to the surface of the electrode or increases the viscosity of the nonaqueous electrolytic solution (i.e., the nonaqueous liquid electrolyte) thereby to increase the internal electric resistance of the battery. According to the inventor's study, it is preferred for obtaining these effects that at least one of $R_1$ and $R_2$ be a group selected from the group consisting of an acyl group, an oxycarbonyl group, and a sulfonyl group. It is also preferred that at least one of $R_1$ and $R_2$ is an oxycarbonyl group and $R_4$ is an oxycarbonyl group. The preference for these groups will be demonstrated in Examples hereinafter given.

Specific but non-limiting examples of the compounds represented by formula (I) are shown below.

(1)

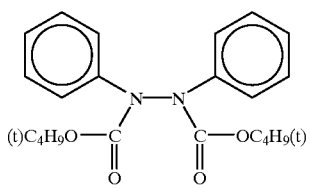

(2)

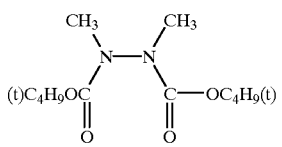

(3)

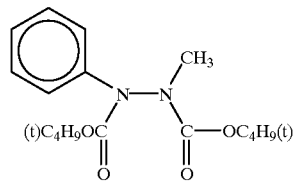

(4)

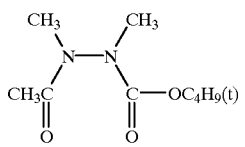

(5)

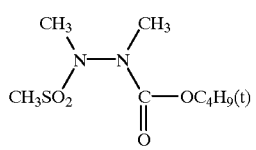

(6)

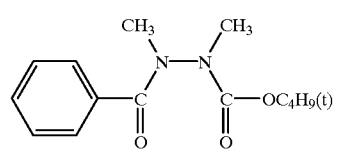

(7)

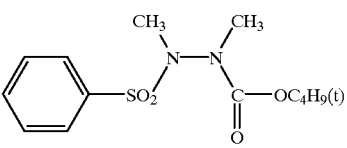

(8)

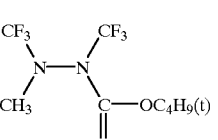

(9)

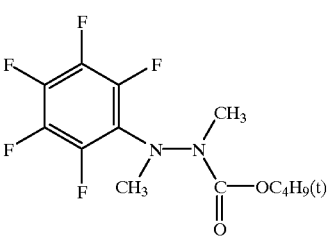

(10)

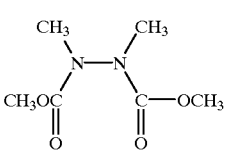

(11)

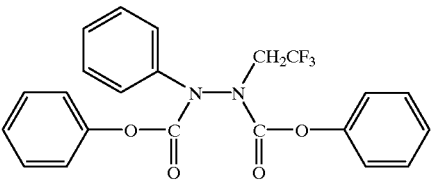

(12)

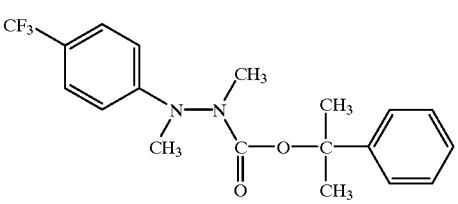

(13)

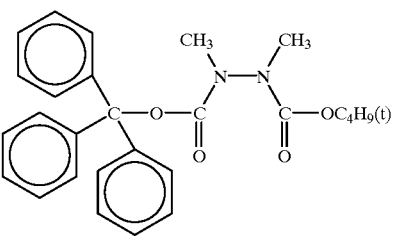

(14)

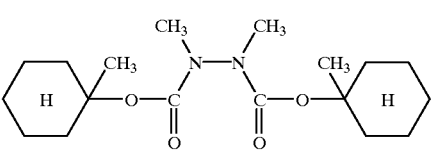

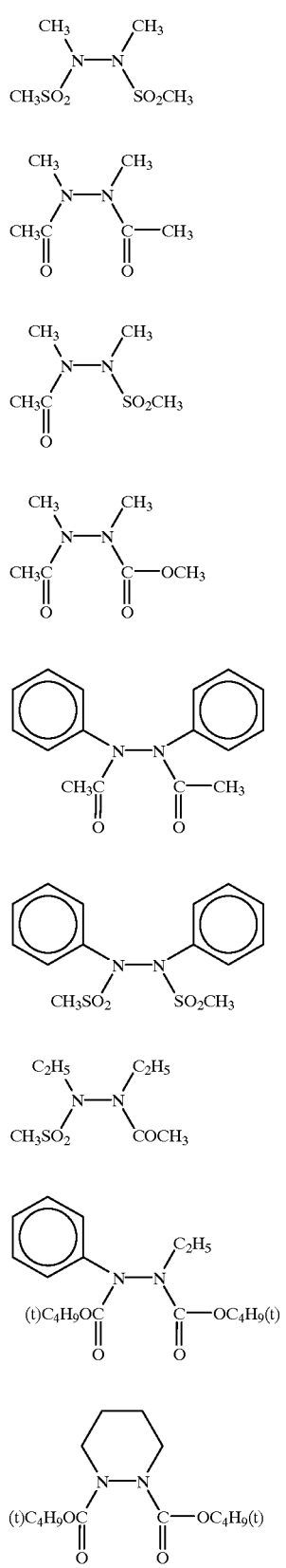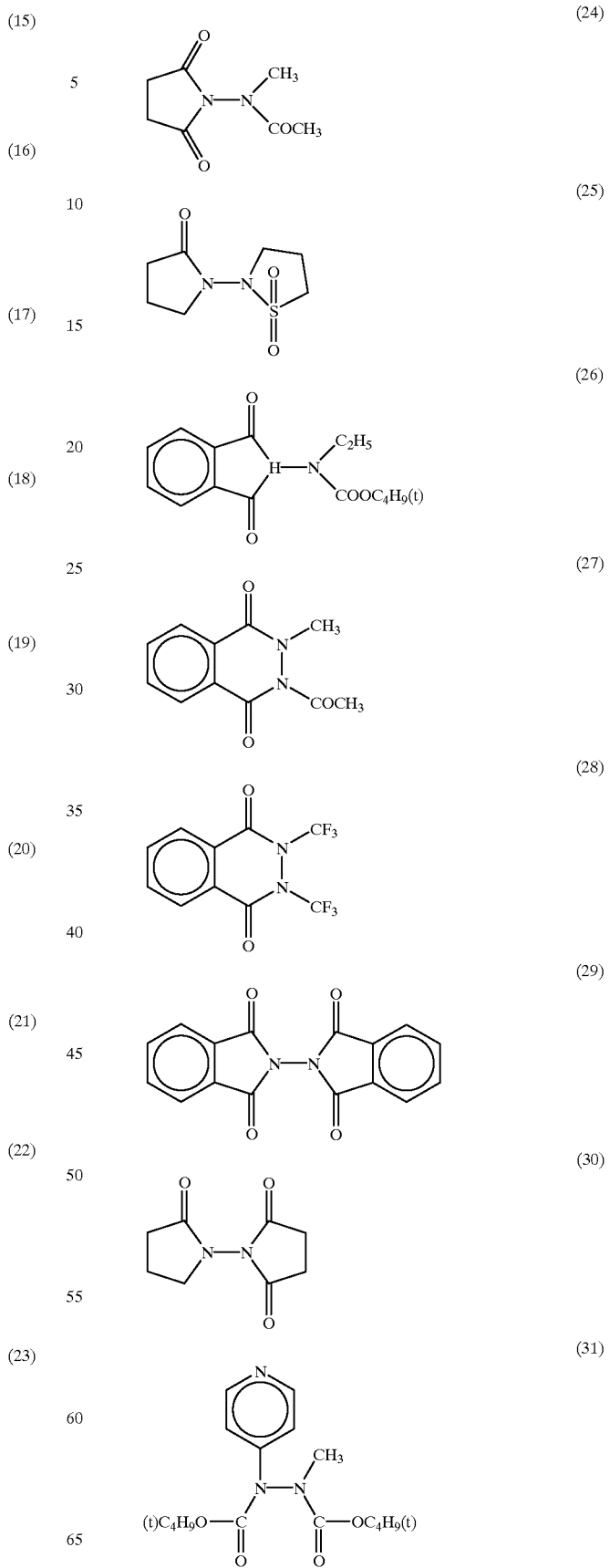

-continued

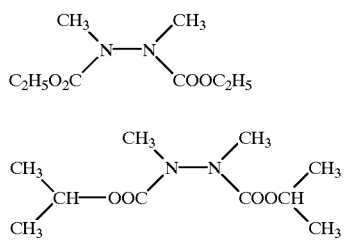

Synthesis of the compounds of formula (I) are described below only for illustrative purposes but not for limitation.

SYNTHESIS EXAMPLE 1

Synthesis of Compound (1)

In a three-necked flask, 18.4 g of hydrazobenzene, 44 g of di-t-butyl dicarbonate, and 500 ml of acetonitrile were mixed and heated at 60° C. for 5 hours while stirring. The reaction mixture was poured into water and extracted with ethyl acetate. The organic phase was dried over magnesium sulfate. After removing the desiccant by filtration, the solvent was evaporated from the filtrate. The resulting oily residue was purified by column chromatography on silica gel using a 10:1 (by volume) mixture of hexane and ethyl acetate as an eluent to give 10 g of Compound (1).

SYNTHESIS EXAMPLE 2

Synthesis of Compound (2)

In the same manner as in Synthesis Example 1 except for replacing hydrazobenzene with 6 g of 1,2-dimethylhydrazine, 7 g of compound (2) was synthesized.

While the compound represented by formula (I) can be added to any of the positive electrode material, the negative electrode material and the electrolytic solution (i.e., the liquid electrolyte), it is preferably added to the electrolytic solution. While not limiting, the amount of the compound added is usually from 1 to 100 g, preferably 5 to 50 g, per kg of the electrolytic solution.

The nonaqueous secondary battery of the present invention is produced by rolling a laminate of a positive electrode sheet and a negative electrode sheet with a separator therebetween, putting the roll into a battery case, electrically connecting the case and the electrodes, pouring an electrolytic solution into the case, and sealing the case. Other various elements, such as a sealing plate, a lead plate, a gasket, and a sheathing material, can be used according to necessity.

The positive electrode sheet and the negative electrode sheet are prepared by applying the corresponding electrode material mixture to the respective current collector, followed by drying and compressing.

The electrode material mixture is prepared by mixing a positive or negative electrode material and an electrically conducting agent, adding to the mixture a binder (a suspension or emulsion of a powdered resin), and a dispersing medium, kneading the mixture, and dispersing the mixture in a stirring mixing machine or a dispersing machine, such as a mixer, a homogenizer, a dissolver, a planetary mixer, a paint shaker, a sand mill, etc. Water or an organic solvent is used as a dispersing medium, with water being preferred. In addition, the electrode material mixture can contain appropriate additives, such as a dispersant, a filler, an ion conducting agent, and a pressure increasing agent.

Application of the electrode material mixture to a current collector is effected by reverse-roll coating, direct roll coating, blade coating, knife coating, extrusion coating, curtain coating, gravure coating, bar coating, dip coating, squeezee coating, or the like coating techniques. Blade coating, knife coating and extrusion coating are preferred. The coating is preferably carried out at a coating speed of 0.1 to 100 m/sec. Proper selection of a coating technique according to the physical properties and drying properties of the electrode material mixture paste will assure satisfactory surface properties of the coated layer. The thickness, length, and width of the coated layer are decided in agreement with the size of the battery. A typical thickness of the coated layer is 10 to 1,000 $\mu$m as dried and compressed.

The coated layer (i.e., the coated electrode sheet) is then dried and dehydrated by drying means such as hot air, vacuum, infrared light, far infrared light, electron beams or low-humidity air or an appropriate combination thereof. A preferred drying temperature is from 80 to 350° C., especially 100 to 250° C. A preferred water content of the coated layer after drying is 2,000 ppm or lower, particularly 500 ppm or lower.

The coated layer (i.e., the coated electrode sheet) is then compressed by a generally employed pressing method. Pressing in a mold or calendering is preferred. While not limiting, the pressing pressure is preferably 10 kg/cm$^2$ to 3 t/cm$^2$. The roll-pressing speed in calendering is preferably 0.1 to 50 m/min, and the pressing temperature is preferably from room temperature to 200° C.

The positive electrode material which can be used in the present invention is a lithium-containing transition metal oxide, which preferably comprises mainly lithium and at least one transition metal element selected from the group consisting of Ti, V, Cr, Mn, Fe, Co, Ni, Mo, and W at a lithium to transition metal molar ratio of 0.3 to 2.2.

Still preferred are those comprising mainly lithium and at least one transition metal element selected from the group consisting of V, Cr, Mn, Fe, Co, and Ni at a lithium to transition metal molar ratio of from 0.3 to 2.2. The Li-containing transition metal oxide can contain Al, Ga, In, Ge, Sn, Pb, Sb, Bi, Si, P, B, etc. in a proportion of less than 30 mol % based on the total transition metals.

Yet still preferred are $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x=0.02 to 1.2; a=0.1 to 0.9; b=0.8 to 0.98; c=1.6 to 1.96; and z=2.01 to 2.3).

The most preferred are $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x=0.02 to 1.2; a=0.1 to 0.9; b=0.9 to 0.98; z=2.01 to 2.3). The value x in the above formulae is the one before commencement of charging and discharging and varies with charges and discharges.

The negative electrode material for use in the invention includes carbonaceous materials capable of intercalating and deintercalating lithium. The carbonaceous material is a material consisting substantially of carbon, such as petroleum pitch, natural graphite, artificial graphite (e.g., vapor-phase growth carbon), carbonaceous materials obtained by burning various synthetic resins (e.g., PAN resins and furfuryl alcohol resins), carbon fibers (e.g., PAN-based carbon fiber, cellulose-based carbon fiber, pitch-based carbon fiber, vapor-phase growth carbon fiber, dehydrated PVA-based carbon fiber, lignin-based carbon fiber, glassy carbon fiber, and activated carbon fiber), mesophase fine spheres, graphite whisker, and tabular graphite.

These carbonaceous materials may be divided into non-graphitized carbon materials and graphitized carbon materials. It is preferred for the carbonaceous materials to have the interplanar spacing, density and crystallite size described in JP-A-62-122066, JP-A-2-66856, and JP-A-3-245473.

The carbonaceous material to be used does not need to be a single material. For example, a mixture of natural graphite and artificial graphite as described in JP-A-5-290884 or graphite having a coating layer as described in JP-A-6-84515 can be used.

The negative electrode material which can be used in the present invention also includes oxides and chalcogen compounds containing at least one metal or semimetal element, i.e., at least one element selected from the groups 1, 2, 13, 14, and 15 of the Periodic Table. Amorphous chalcogen compounds or amorphous oxides are preferred. The terminology "amorphous" as used herein means to have a broad scattering band having a peak at 20 to 40° in terms of $2\theta$ in X-ray diffractometry using CuKα rays. The amorphous compound may also exhibit a diffraction line assigned to a crystalline structure. It is preferable that the maximum intensity of the crystalline diffraction lines which appear at 40 to 70° in terms of $2\theta$ is not higher than 500 times, still preferably not higher than 100 times, particularly preferably not higher than 5 times, the peak intensity of the broad scattering band which appears at 20 to 40° in terms of $2\theta$. It is most preferred that the compound has no diffraction line attributed to a crystalline structure.

The above-mentioned chalcogen compounds or oxides are preferably composite chalcogen compounds or composite oxides mainly comprising two or more elements selected from the group consisting of B, Al, Ga, In, Tl, Si, Ge, Sn, Pb, P, As, Sb, and Bi. Composite chalcogen compounds or composite oxides mainly comprising two or more elements selected from the group consisting of B, Al, Si, Ge, Sn, and P are still preferred. These composite chalcogen compounds or composite oxides contain an element selected from the groups 1 and 2 of the Periodic Table chiefly for modification of the amorphous structure.

Amorphous composite oxides mainly comprising tin represented by the formula shown below are particularly preferred among the above-described negative electrode materials.

$$SnM^3_c M^4_d O_t$$

wherein $M^3$ represents at least one element selected from the group consisting of Al, B, P, Ge, and Si; $M^4$ represents at least one element selected from the group consisting of elements of groups 1 and 2 of the Periodic Table; c represents a number of from 0.2 to 2; d represents a number of from 0.01 to 1; provided that $0.2<c+d<2$; and t represents a number of from 1 to 6.

The amorphous composite oxides used in the invention can be synthesized by either a calcining process or a solution process such as a coprecipitation method.

The calcining process is preferably carried out by mixing oxides or compounds of the elements shown in the above formula and calcining the mixture to obtain an amorphous composite oxide. Calcining process is preferably conducted at a rate of temperature rise of 5° to 200° C./min, at a calcining temperature of 500° to 1500° C. for a calcining time of 1 to 100 hours. The rate of temperature drop is preferably 2 to 107° C./min.

The term "rate of temperature rise" as used herein means an average rate of temperature rise of from 50% of the calcining temperature (°C.) to 80% of the calcining temperature (°C.), and the term "rate of temperature drop" as used herein means an average rate of temperature drop of from 80% of the calcining temperature (°C.) to 50% of the calcining temperature (°C.).

Cooling can be effected either within a kiln or out of the kiln, for example, by pouring the product into water. Ultrarapid cooling methods described in *Ceramics Processing,* p. 217, Gihodo (1987), such as a gunning method, a Hammer-Anvil method, a slap method, a gas atomizing method, a plasma spraying method, a centrifugal quenching method, and a melt drag method, can also be used. Further, cooling may be conducted by a single roller quenching method or a twin roller quenching method described in *New Glass Handbook,* p. 172, Maruzen (1991). Where the material melts during calcining, the calcined product may be taken out continuously while feeding the raw materials to the kiln. Where the material melts during calcining, the melt is preferably stirred.

The calcining atmosphere preferably has an oxygen content of not more than 5% by volume. An inert gas atmosphere is still preferred. Suitable examples of the inert gas include nitrogen, argon, helium, krypton, and xenon. The most preferred inert gas is pure argon.

Specific but non-limiting examples of the negative electrode material useful in the present invention are shown below.

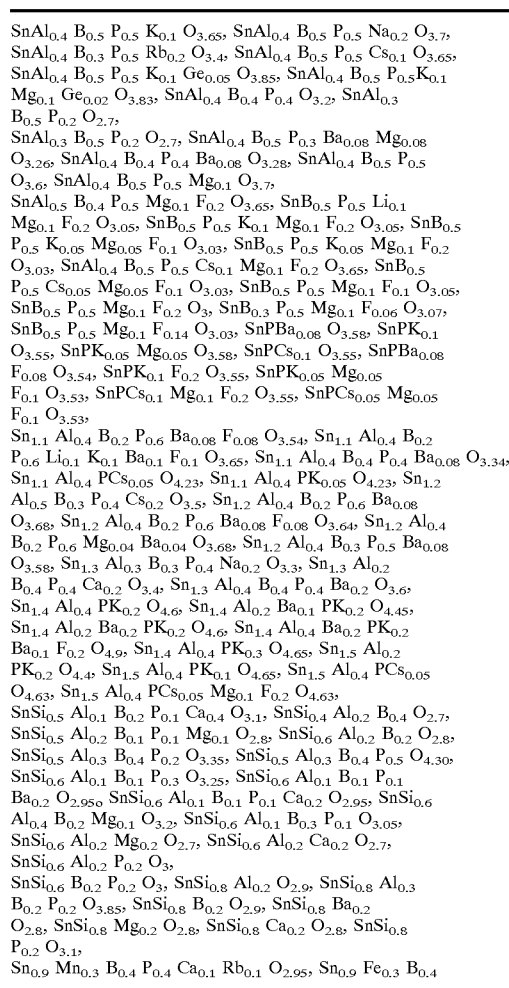

-continued $P_{0.4} Ca_{0.1} Rb_{0.1} O_{2.95}$, $Sn_{0.8} Pb_{0.2} Ca_{0.1} P_{0.9} O_{3.35}$,
$Sn_{0.3} Ge_{0.7} Ba_{0.1} P_{0.9} O_{3.35}$, $Sn_{0.9} Mn_{0.1} Mg_{0.1} P_{0.9} O_{3.35}$,
$Sn_{0.2} Mn_{0.8} Mg_{0.1} P_{0.9} O_{3.35}$, $Sn_{0.7} Pb_{0.3} Ca_{0.1} P_{0.9} O_{3.35}$
$Sn_{0.2} Ge_{0.8} Ba_{0.1} P_{0.9} O_{3.35o}$ The chemical formula of the compound obtained by calcining can be determined by inductively coupled plasma (ICP) atomic emission spectroanalysis or, more conveniently, by calculation making use of the difference in powder weight between before and after the calcining.

The positive electrode active material or the negative electrode material used in the present invention preferably have an average particle size of 0.1 to 60 μm. It is still preferred that the average particle size falls within a range of from 0.7 to 25 μm and that at least 60% by volume of the total particles have a particle size of 0.5 to 30 μm. The negative electrode material preferably has such particle size distribution that the proportion of a particle group having a particle size of 1 μm or smaller is not more than 30% by volume based on the total volume of the total particles, and the proportion of a particle group having a particle size of 20 μm or greater is not more than 25% by volume based on the total volume of the total particles. It is needless to say that the particle diameter of the electrode materials used should not exceed the thickness of the electrode material mixture on one side of the respective electrode.

The term "average particle size" as used herein means a median diameter of primary particles, which can be measured with a laser diffraction type particle size distribution measuring apparatus.

Well-known grinding machines and classifiers can be used for particle size adjustment. Examples of useful grinding machines include a mortar, a ball mill, a sand mill, a vibration ball mill, a satellite ball mill, a planetary ball mill, a spinning air flow type jet mill and sieve. If necessary, the grinding can be conducted in a wet process using water or an organic solvent, such as methanol. In order to adjust to a prescribed particle size, the ground particles are preferably classified. The manner of classification is not particularly limited, and a sieve, an air classifier, etc. can be used appropriately. Classification is carried out either in a dry process or a wet process.

The negative electrode material preferably has a BET specific surface area of 0.1 to 20 $m^2/g$.

The electrically conducting agent (hereinafter simply referred to a conducting agent) which can be used in the electrode material mixture may be any electron-conducting material which undergoes no chemical change in an assembled battery. Suitable examples of the conducting agents include natural graphite such as scaly graphite, flaky graphite, and earthy graphite; those obtained by calcining petroleum coke, coal coke, cellulose materials, sugars, mesophase pitch, etc. at high temperature; artificial graphite such as vapor-phase growth graphite; carbon black such as acetylene black, furnace black, Ketjen black, channel black, lamp black, and thermal black; carbon materials such as asphalt pitch, coal tar, activated carbon, mesophase pitch, and polyacene; electrically conducting fibers such as metallic fibers; metal powders such as copper, nickel, aluminum and silver; conductive whiskers, such as zinc oxide whisker and potassium titanate whisker; and conductive metal oxides such as titanium oxide; and mixtures of two or more thereof. Graphite and carbon black are preferred of them.

The conducting agent is preferably used in an amount of from 6 to 50% by weight, still preferably from 6 to 30% by weight, based on the negative electrode material or positive electrode material. In particular, carbon black or graphite is preferably used in an amount of from 6 to 20% by weight.

A binder is used to hold the electrode material mixture. Examples of useful binders include polysaccharides, thermoplastic resins, and polymers having rubbery elasticity. Examples of suitable binders include water-soluble polymers, such as starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinyl pyrrolidone, polyacrylamide, polyhydroxy(meth)acrylates, and styrene-maleic acid copolymers; emulsions (latices) or suspensions of polyvinyl chloride, tetrafluoroethylene, polyvinylidene fluoride, tetrafluoroethylene-hexafluoropropylene copolymers, vinylidene fluoride-tetrafluoroethylene-hexafluoropropylene copolymers, polyethylene, polypropylene, ethylene-propylene-diene terpolymers (EPDM), sulfonated EPDM, polyvinyl acetal resins, (meth)acrylate copolymers comprising a (meth) acrylic ester unit (e.g., methyl methacrylate or 2-ethylhexyl acrylate), (meth)acrylate-acrylonitrile copolymers, polyvinyl ester copolymers comprising a vinyl ester unit (e.g., vinyl acetate), styrene-butadiene copolymers, acrylonitrile-butadiene copolymers, polybutadiene, neoprene rubber, fluororubbers, polyethylene oxide, polyester polyurethane resins, polyether polyurethane resins, polycarbonate polyurethane resins, polyester resins, phenolic resins, and epoxy resins; and mixtures of two or more thereof. Among these, latex of acrylate polymers, carboxymethyl cellulose, polytetra-fluoroethylene, and polyvinylidene fluoride are preferred.

The binder is preferably used in a proportion of 1 to 30% by weight, particularly 2 to 10% by weight, based on the electrode material mixture. If used in too small a proportion, the binder has an insufficient cohesive force or insufficient capability of holding the electrode material mixture. Use of too much binder increases the volume of the electrode, resulting in reduction of capacity per unit volume or unit weight of the electrode.

Any fibrous material that does not undergo chemical change in an assembled battery can be used as a filler. Fibers of polyolefins (e.g., polypropylene or polyethylene), glass or carbon are usually used. While not limiting, the filler is preferably used in an amount of from 0 up to 30% by weight based on the electrode material mixture.

Examples of the ion conducting agent which can be added to the electrode material mixture includes substances well-known as an organic or inorganic solid electrolyte. The details will be furnished later with reference to an electrolytic solution (i.e., a liquid electrolyte).

The pressure increasing agent which can be added to the electrode material mixture is a compound capable of increasing the internal pressure of a battery, which is typically exemplified with carbonates.

Current collectors used in the present invention can be foil, expanded metal, punched metal or net. Suitable examples of the materials of a current collector for the positive electrode include aluminum, stainless steel, nickel, titanium, and alloys thereof. Aluminum foil is preferred for the positive electrode. Suitable examples of the materials of a current collector for the negative electrode include copper, stainless steel, nickel, titanium, and alloys thereof. Copper foil is preferred for the negative electrode.

The separator which can be used in the present invention is made of an insulating material exhibiting high ion permeability and certain mechanical strength. Suitable examples of the materials of the separator include olefin polymers, fluororesins, cellulosic polymers, polyimide, nylon, glass fiber, and alumina fiber. Among these, polypropylene, polyethylene, a mixture of polypropylene and polyethylene, a mixture of polypropylene and Teflon, and a mixture of polyethylene and Teflon are preferred. Examples of suitable forms of the separator include nonwoven fabric, woven fabric, and porous film, with porous film being preferred. Porous film having a pore size of 0.01 to 1 μm and a thickness of 5 to 50 μm is particularly preferred.

An electrolytic solution (i.e., a liquid electrolyte) is generally made up of a supporting salt and a solvent. The supporting salt mainly used in lithium secondary batteries is a lithium salt.

Examples of suitable lithium salts include $LiClO_4$, $LiBF_4$, $LiPF_6$, $LiCF_3CO_2$, $LiAsF_6$, $LiSbF_6$, $LiB_{10}Cl_{10}$, fluorosulfonic acids represented by formula, $LiOSO_2C_nF_{2n+1}$ (wherein n is a positive integer of 6 or smaller), imide salts represented by formula, $LiC(SO_2C_nF_{2n+1})(SO_2C_mF_{2m+1})$ (wherein m and n are each a positive integer of 6 or smaller), methide salts represented by formula, $LiN(SO_2C_pF_{2p+1})(SO_2C_qF_{2q+1})(SO_2C_rF_{2r+1})$ (p, q and r each are a positive integer of 6 or smaller), lower fatty acid salts of lithium, $LiAlCl_4$, LiCl, LiBr, LiI, chloroboran lithium, and lithium tetraphenylborate. These Li salts can be used individually or as a mixture of two or more thereof. Among these, $LiBF_4$, $LIPF_6$ or a mixture thereof is preferred. While not limiting, these supporting salts are dissolved in a solvent in a concentration of 0.2 to 3 mol per liter of the electrolytic solution.

Examples of useful solvents include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxane, acetonitrile, nitromethane, ethyl monoglyme, phosphoric acid triesters, trimethoxymethane, dioxolane derivatives, sulfolane, 3-methyl-2-oxazolidinone, propylene carbonate derivatives, tetrahydrofuran derivatives, diethyl ether, and 1,3-propanesultone. They can be used individually or as a mixture of two or more thereof. Preferred of these solvents are carbonate solvents. Mixtures of a cyclic carbonate (e.g., ethylene carbonate and propylene carbonate) and an acyclic carbonate (e.g., diethyl carbonate, dimethyl carbonate, and methyl ethyl carbonate) are still preferred.

An electrolytic solution (i.e., a liquid electrolyte) comprising an appropriately mixed solvent of ethylene carbonate, propylene carbonate, 1,2-dimethoxyethane, dimethyl carbonate, and/or diethyl carbonate having dissolved therein $LiCF_3SO_3$, $LiClO_4$, $LiBF_4$ and/or $LiPF_6$ is preferred. An electrolytic solution comprising a mixed solvent of at least one of propylene carbonate and ethylene carbonate and at least one of dimethyl carbonate and diethyl carbonate, having dissolved therein at least one of $LiCF_3SO_3$, $LiClO_4$ and $LiBF_4$ and $LiPF_6$ is still preferred. The amount of the electrolytic solution to be put in a battery is not particularly limited and is decided appropriately according to the amount of the electrode materials or the size of the battery.

In addition to the electrolytic solution (i.e., the liquid electrolyte), the following solid electrolytes can be used in combination. Solid electrolytes are divided into inorganic ones and organic ones. Examples of well-known inorganic solid electrolytes include lithium nitride, a lithium halide, and a lithium oxyacid salt. Among them, $Li_3N$, LiI, $Li_5NI_2$, $Li_3N$—LiI—LiOH, $Li_4SiO_4$, $Li_4SiO_4$—LiI—LiOH, $xLi_3PO_4$—$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ion-dissociation group, a mixture of a polymer containing an ion-dissociation group and the above-mentioned aprotic electrolyte, phosphoric acid ester polymers, and polymeric matrix materials containing an aprotic polar solvent.

A method of adding polyacrylonitrile to an electrolytic solution and a method of combining an organic solid electrolyte and an inorganic solid electrolyte are also known.

The electrolyte may contain other compounds for the purpose of improving discharge performance and charge and discharge characteristics. Examples of useful compounds include pyridine, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$, a monomer providing a conductive polymer as an electrode active material, triethylenephosphoramide, a trialkylphosphine, morpholine, an aryl compound having a carbonyl group, a crown ether (e.g., 12-crown-4), hexamethylphosphoric triamide and a 4-alkylmorpholine, a bicyclic tertiary amine, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to impart suitability to high-temperature storage, carbonic acid gas may be incorporated into the electrolytic solution.

The electrolytic solution is poured into a battery case either all at once or in two or more divided portions. In the latter mode of addition, which is preferred to the former, the portions may be the same or different in composition. For example, addition of a nonaqueous solvent (A) or a solution of a lithium salt in the nonaqueous solvent (A) can be followed by addition of a nonaqueous solvent (B) having a higher viscosity than the solvent (A) or a solution of a lithium salt in the nonaqueous solvent (B) having a higher viscosity than the solvent (A). The time required for the addition can be shortened by evacuating the battery case or applying centrifugal force or ultrasonic waves to the battery case.

The battery case (i.e., can) and cap (i.e., lid) are made of nickel-plated steel, stainless steel (SUS304, SUS304L, SUS304N, SUS316, SUS316L, SUS430 or SUS444), nickel-plated stainless steel (the above examples apply), aluminum or aluminum alloys, nickel, titanium or copper. Examples of the shape of the battery case includes cylinders with a section of a true circle or an ellipse, prisms with a section of a square or a rectangle. That is, the shape of the battery may be a button, a coin, a sheet, or a square (including a rectangle). Where a battery case serves as a negative electrode terminal, it is preferably made of a stainless steel plate or a nickel-plated steel plate. Where a battery case serves as a positive electrode terminal, it is preferably made of a stainless steel plate, an aluminum plate or an aluminum alloy plate.

As a measure against an increase of the internal pressure due to abnormal reaction in a battery or a runaway reaction, an explosion-proof valve and a current breaking element are preferably incorporated into the battery. It is particularly preferred that the sealing part of a battery be provided with a combination of an explosion-proof valve which is deformed by an increased internal pressure to release the internal pressure and a current breaking switch which works in response to the deformation of the valve. Such a pressure-sensitive explosion-proof valve and a current breaking switch are described in JP-A-2-112151, JP-A-2-288063, JP-A-6-215760, and JP-A-9-92334. In addition, various known safety elements, such as a fuse, a bimetal, a PTC element, and the like, may be provided.

A lead plate which can be used in the present invention is made of an electrically conductive metal, such as iron, nickel, titanium, chromium, molybdenum, copper or aluminum, or an alloy thereof. The cap, case, electrode sheets, and lead plate are welded by a well-known technique, such as direct current or alternating current electric welding, laser welding or ultrasonic welding. Conventionally known sealants, such as asphalt, can be used for sealing.

Gaskets made of an olefin polymer, a fluororesin, a cellulosic polymer, polyimide, polyamide, etc. can be used in the battery of the present invention. Gaskets made of an olefin polymer, particularly a propylene polymer (especially polypropylene or a propylene-ethylene block copolymer), are preferred for their resistance to organic solvents and low permeability to moisture.

The battery assembled from the above-described materials and members is preferably subjected to aging treatment including pretreatment, activation, and post-treatment, thereby to ensure a high charge and discharge capacity and excellent cycle properties. The pretreatment is for making the distribution of lithium even in the electrodes, which is accomplished by, for example, an appropriate combination of lithium dissolution control, temperature control for uniform lithium distribution, rocking and/or rotation treatment, and a charge and discharge treatment. The activation treatment is for intercalating lithium into the negative electrode of the battery. In this treatment, lithium is preferably intercalated in an amount of 50 to 120% of the amount of lithium intercalated by a charge in actual use of the battery. The post-treatment is for ensuring the activation treatment and includes a preserving treatment for making the battery reaction uniform and a charge and discharge treatment for inspection, which can be combined arbitrarily.

If desired, the battery of the invention is covered with a sheathing material, such as a shrinkable tube, an adhesive tape, a metallic film, paper, cloth, paint, and a plastic case. At least part of the sheath may be made of a thermochromic material so that the thermal history during use could be seen.

If desired, a plurality of the batteries can be connected in series and/or parallel to make a pack of batteries. The pack of batteries can have safety elements, such as a PTC element, a temperature fuse, a fuse, and/or a current breaking element, and a safety circuit (a circuit having a function for monitoring the voltage, temperature, current, etc. of the individual batteries and/or the set of the batteries, combined, if desired, with a function for shutting the current flow). The battery pack can also have external terminals in addition to the positive and negative terminals for the battery set, such as positive and negative terminals for the individual batteries, thermal sensor terminals for the battery set and the individual batteries, and a current sensor terminal for the battery set. The battery pack may contain a voltage converting circuit (e.g., a DC—DC convertor). The individual batteries can be connected by welding lead plates or detachably connected by means of sockets. The battery pack may have a function of displaying the residual capacity, necessity of a charge, the number of times of use, and the like.

The secondary battery according to the present invention is useful in a wide variety of equipment. It is particularly suitable to video cameras, portable video tape recorders with a monitor, movie cameras with a monitor, compact cameras, single-lens reflex cameras, film units with a lens, notebook personal computers, notebook word processors, pocket (palm-top) personal computers, mobile phones, wireless phone extensions, electrical shavers, electrical tools, motor mixers, automobiles, and so on.

Preferred embodiments of the present invention are as follows.

1) The nonaqueous secondary battery containing the hydrazine derivative of formula (I) wherein at least one of $R_1$ and $R_2$ is an acyl group,, an oxycarbonyl group or a sulfonyl group.
2) The nonaqueous secondary battery containing the hydrazine derivative of formula (I) wherein at least one of $R_1$ and $R_2$ is an oxycarbonyl group, and $R_4$ is an oxycarbonyl group.
3) The nonaqueous secondary battery containing the hydrazine derivative of formula (I) in the nonaqueous electrolytic solution.
4) The nonaqueous secondary battery containing the hydrazine derivative of formula (I) in the nonaqueous electric solution in an amount of 1 to 50 g per kg of the electrolytic solution.
5) The nonaqueous secondary battery according to any one of the above embodiments, wherein the nonaqueous electrolytic solution contains a cyclic carbonate, a chain carbonate or a mixture thereof as a nonaqueous solvent.
6) The nonaqueous secondary battery according to any one of the above embodiments, wherein the lithium salt in the nonaqueous electrolytic solution is $LiPF_6$, $LiBF_4$ or a mixture thereof.
7) The nonaqueous secondary battery according to any one of the above embodiments, wherein the battery is provided with a pressure-sensitive safety valve and a current breaking switch which works in response to the pressure-sensitive safety valve.

The invention will now be illustrated in greater detail with Examples, but it should be understood that the invention is not construed as being limited thereto. Unless otherwise indicated, all the parts area by weight.

EXAMPLE 1

Preparation of Positive Electrode Material Mixture Paste $LiCoO_2$ (200 g) as a positive electrode active material was mixed with 10 g of acetylene black in a homogenizer. Subsequently, 8 g of an aqueous dispersion (solid contents: 50%) of a 2-ethylhexyl acrylate/acrylic acid/acrylonitrile copolymer, and 60 g of a 2% aqueous solution of carboxymethyl cellulose were added thereto as a binder and mixed. The mixture was further kneaded together with 50 g of water in a homogenizer to prepare a paste for a positive electrode material mixture.

$LiCoO_2$ used here as a positive electrode material was prepared by putting a 3:2 (by mole) mixture of lithium carbonate and tricobalt tetroxide in an alumina crucible, calcining the mixture at 750° C. (rate of temperature rise: 2° C./min) for 4 hours in air, further elevating the temperature up to 900° C. at a rate of 2° C./min, at which the mixture was calcined for 8 hours, followed by grinding to a median particle size of 5 μm. A dispersion containing 50 g of the resulting particles (after being washed) in 100 ml of water had an electric conductivity of 0.6 mS/m and a pH of 10.1. The specific surface area of the particles was 0.42 m²/g as measured by a nitrogen adsorption method.

Preparation of Negative Electrode Material Mixture Paste $SnGe_{0.1}B_{0.5}P_{0.58}Mg_{0.1}K_{0.1}O_{3.35}$ (200 g) as a negative electrode material was mixed with 30 g of artificial graphite as a conducting agent in a homogenizer. The mixture was kneaded with 50 g of a 2% aqueous solution of carboxymethyl cellulose and 10 g of polyvinylidene fluoride, and further kneaded with 30 g of water to prepare a paste for a negative electrode material mixture.

The negative electrode material used here was prepared by dry blending 6.7 g of tin monoxide, 10.3 g of tin pyrophosphate, 1.7 g of diboron trioxide, 0.7 g of potassium carbonate, 0.4 g of magnesium oxide, and 1.0 g of germanium dioxide, putting the blend in an alumina crucible, heating the blend to 1000° C. at a rate of temperature rise of 15° C./min in an argon atmosphere, calcining the blend at 1100° C. for 12 hours, dropping the temperature to room temperature at a rate of 10° C./min, and grinding the calcined product taken out of the calcining kiln in a jet mill to an average particle size of 4.5 μm. The resulting compound showed a broad band having a peak at around 28° (in terms of 2θ) in X-ray diffractometry using CuKα rays, with no crystalline diffraction lines between 40° and 70° (in terms of 2θ).

Preparation of Positive and Negative Electrode Sheets

The positive electrode material mixture paste was applied to each side of a 30 μm thick aluminum foil current collector in a coating weight of 400 g/m²/side by means of a blade coater, dried, and compression molded by a roller press to obtain a 280 μm thick sheet. The sheet was cut into a band of prescribed size, and thoroughly dehydrated by heating with a far infrared heater in a dry box (dry air having a dew point of −50° C. or lower) to prepare a positive electrode sheet.

Similarly, the negative electrode material mixture paste was applied to each side of a 20 μm thick copper foil current collector in a coating weight of 70 g/m²/side and compressed to obtain a negative electrode sheet having a thickness of 90 μm.

Preparation of Electrolytic Solution

In an argon atmosphere 65.3 g of diethyl carbonate was put in a 200 ml-volume narrow-necked polypropylene container, and 22.2 g of ethylene carbonate was dissolved therein in small portions taking care that the liquid temperature did not exceed 30° C. Then 0.4 g of $LiBF_4$ and 12.1 g of $LiPF_6$ were slowly dissolved therein in this order taking care that the liquid temperature did not exceed 30° C. The resulting electrolytic solution (designated E-1) was a colorless transparent liquid having a specific gravity of 1.135, a water content of 18 ppm as measured with a Karl Fischer's titration apparatus (Model MKC-210 manufactured by Kyoto Denshi K.K.), and a free acid content of 24 ppm as measured by neutralization titration using bromthymol blue as an neutralization indicator and a 0.1N NAOH aqueous solution.

Electrolytic solutions E-2 to E-15 were prepared by adding to Electrolytic solution E-1 each of the compounds shown in Table 1 below in a prescribed concentration. In Table 1, comparative compound A shown below is biphenyl described in JP-A-9-106835.

Comparative Compound A:

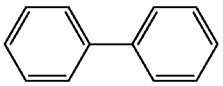

TABLE 1

| Electrolytic Solution | Additive | Concn. (mol/l) |
|---|---|---|
| E-1 | none | 0 |
| E-2 | compound (1) | 0.01 |
| E-3 | compound (1) | 0.05 |
| E-4 | compound (1) | 0.1 |
| E-5 | compound (2) | 0.0.1 |
| E-6 | compound (2) | 0.05 |
| E-7 | compound (2) | 0.1 |
| E-8 | compound (4) | 0.05 |
| E-9 | compound (5) | 0.05 |
| E-10 | compound (15) | 0.05 |
| E-11 | compound (16) | 0.05 |
| E-12 | compound (17) | 0.05 |
| E-13 | comparative compound A | 0.01 |
| E-14 | comparative compound A | 0.05 |
| E-15 | comparative compound A | 0.1 |

Preparation of Cylinder Battery

Cylinder batteries having the structure shown in FIG. 1 were prepared as follows. The positive electrode sheet, a finely porous polyethylene film separator, the negative electrode sheet, and the separator were put one on top of another in the order described and rolled up into a roll (i.e., an electrode group) (2). The electrode group rolled up (i.e., the roll) (2) was put in a closed-end battery case (1) made of a nickel-plated iron plate which also served as a negative electrode terminal. An upper insulating plate (3) was fitted into the case. Electrolytic solution E-1 was poured into the case. A cap unit composed of a positive electrode terminal (6), an insulating ring, a PTC element (63), a current breaking element (62), and a pressure-sensitive valve (61) was cramped to the open top of the case via a gasket (5) to prepare a cylindrical battery (designated D-1). Batteries D-2 to D-15 were prepared in the same manner as described above, except for replacing Electrolytic solution E-1 with each of Electrolytic solutions E-2 to E-15. Ten batteries were made for each electrolytic solution.

EXAMPLE 2

Batteries D-16 to D-24 were prepared in the same manner as in Example 1, except for using Electrolytic solutions E-1, E-3, E-6, E-8 to 12, and E-14 and using graphite powder as a negative electrode material.

Evaluation of Battery Characteristics

The batteries prepared in Examples (10 samples for each group) were subjected to 10 charge and discharge cycles under conditions of a current density of 4.8 mA/cm², a final charge voltage of 4.1 V, and a final discharge voltage of 2.7 V. The discharge capacity in the 10th cycle was measured, and an average of each 10 batteries was obtained. The average discharge capacity was divided by the average capacity of battery D-1 (n=10) to obtain a relative capacity. The cycle test was further carried on, and the ratio of the discharge capacity on the 300th cycle to that of the 10th cycle was obtained, which was taken as a cycle capacity. The results obtained are shown in Table 2 below.

TABLE 2

| Battery | Electrolytic Solution | Relative Capacity | Cycle Capacity | Remark |
|---------|----------------------|-------------------|----------------|--------|
| D-1 | E-1 | 1 | 0.87 | comparison |
| D-2 | E-2 | 1 | 0.94 | invention |
| D-3 | E-3 | 1 | 0.95 | " |
| D-4 | E-4 | 1.01 | 0.91 | " |
| D-5 | E-5 | 1.01 | 0.91 | " |
| D-6 | E-6 | 1 | 0.92 | " |
| D-7 | E-7 | 1.01 | 0.93 | " |
| D-8 | E-8 | 1.02 | 0.92 | " |
| D-9 | E-9 | 1.01 | 0.93 | " |
| D-10 | E-10 | 1 | 0.94 | " |
| D-11 | E-11 | 1.01 | 0.94 | " |
| D-12 | E-12 | 1 | 0.92 | " |
| D-13 | E-13 | 0.98 | 0.86 | comparison |
| D-14 | E-14 | 0.93 | 0.84 | " |
| D-15 | E-15 | 0.89 | 0.83 | " |
| D-16 | E-1 | 0.82 | 0.90 | " |
| D-17 | E-3 | 0.82 | 0.92 | invention |
| D-18 | E-6 | 0.83 | 0.93 | " |
| D-19 | E-8 | 0.83 | 0.91 | " |
| D-20 | E-9 | 0.82 | 0.91 | " |
| D-21 | E-10 | 0.83 | 0.92 | " |
| D-22 | E-11 | 0.83 | 0.91 | " |
| D-23 | E-12 | 0.82 | 0.92 | " |
| D-24 | E-14 | 0.79 | 0.88 | comparison |

As is apparent from the results of Table 2, addition of the compound represented by formula (I) to the electrolytic solution brings about improved cycle characteristics without causing a reduction in capacity. It is also seen that an excellent cycle stabilizing effect is produced when an amorphous composite oxide is used as a negative electrode material as compared with use of a carbonaceous material. Additionally, it has been revealed that biphenyl, which is a compound proposed in JP-A-9-1106835, causes a reduction in capacity with an increase of the amount added.

EXAMPLE 3

An electrolytic reaction was conducted using Electrolytic solutions E-1, E-3, E-6, E-8 to 12, and E-14 in a glove box purged with argon. Metallic lithium and platinum were used as a cathode and an anode, respectively, and a voltage of 4.3 to 4.7 V was applied. As a result, electrolytic solutions E-3, E-6 and E-8 to 12 were observed to form extremely air bubbles as compared with E-1 and also showed a reduction of the compound added. Electrolytic solution E-14 showed a reduction of the compound (Comparative Compound A) added but was equal to E-1 in degree of gas evolution.

When the batteries of Example 1 were put in a overcharged condition, it was confirmed that the current breaking mechanism worked surely.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode, a negative electrode, and a nonaqueous electrolytic solution containing a lithium salt, wherein said battery contains a hydrazine derivative represented by formula (I):

$$R_1R_2N-NR_3R_4 \qquad (I)$$

wherein $R_1$, $R_2$, and $R_3$ each represents an alkyl group, an aryl group, a heterocyclic group, an acyl group, an oxycarbonyl group or a sulfonyl group; and $R_4$ represents an acyl group, an oxycarbonyl group or a sulfonyl group.

2. The nonaqueous secondary battery as in claim 1, wherein at least one of $R_1$ and $R_2$ is an acyl group, an oxycarbonyl group or a sulfonyl group.

3. The nonaqueous secondary battery as in claim 1, wherein at least one of $R_1$ and $R_2$ is an oxycarbonyl group, and $R_4$ is an oxycarbonyl group.

4. The nonaqueous secondary battery as in claim 1, wherein said hydrazine derivative is dissolved in the nonaqueous electrolytic solution.

5. The nonaqueous secondary battery as in claim 4, wherein said hydrazine derivative is contained in an amount of 1 to 100 g per kg of the electrolytic solution.

6. The nonaqueous secondary battery as in claim 4, wherein said hydrazine derivative is contained in an amount of 5 to 50 g per kg of the electrolytic solution.

7. The nonaqueous secondary battery as in claim 1, wherein said nonaqueous electrolytic solution contains a cyclic carbonate, a chain carbonate or a mixture thereof as a nonaqueous solvent.

8. The nonaqueous secondary battery as in claim 1, wherein said lithium salt in the nonaqueous electrolytic solution is $LiPF_6$, $LiBF_4$ or a mixture thereof.

9. The nonaqueous secondary battery as in claim 1, wherein said battery is provided with a pressure-sensitive safety valve and a current breaking switch which works in response to the pressure-sensitive safety valve.

* * * * *